(12) United States Patent
Geva et al.

(10) Patent No.: US 8,971,356 B2
(45) Date of Patent: Mar. 3, 2015

(54) TIMING OVER PACKET DEMARCATION ENTITY

(75) Inventors: Alon Geva, Hod Ha'sharon (IL); Gabriel Zigelboim, Tel Aviv (IL); Yaakov Stein, Jerusalem (IL)

(73) Assignee: Rad Data Communications Ltd., Tel Aviv (IL)

( * ) Notice: Subject to any disclaimer, the term of this patent is extended or adjusted under 35 U.S.C. 154(b) by 638 days.

(21) Appl. No.: 13/097,112

(22) Filed: Apr. 29, 2011

(65) Prior Publication Data

US 2012/0275317 A1 Nov. 1, 2012

(51) Int. Cl.
*H04J 3/06* (2006.01)
*H04L 12/26* (2006.01)
*H04L 12/24* (2006.01)

(52) U.S. Cl.
CPC ............. *H04L 43/106* (2013.01); *H04J 3/0667* (2013.01); *H04L 41/06* (2013.01)
USPC ........................................................ 370/503

(58) Field of Classification Search
USPC ........... 370/503, 350, 516, 282, 389; 375/371
See application file for complete search history.

(56) References Cited

U.S. PATENT DOCUMENTS

| 6,058,136 | A | 5/2000 | Ganesh et al. |
| 6,272,132 | B1 | 8/2001 | Ofek et al. |
| 6,470,031 | B1 | 10/2002 | Loy et al. |
| 6,917,609 | B2 | 7/2005 | Dickey |
| 7,289,538 | B1 | 10/2007 | Paradise et al. |
| 7,551,647 | B2 | 6/2009 | Fellman et al. |
| 2011/0150008 | A1* | 6/2011 | Le Pallec et al. ............. 370/503 |
| 2011/0200051 | A1* | 8/2011 | Rivaud et al. ................ 370/400 |
| 2012/0093002 | A1* | 4/2012 | Osborne .................... 370/241.1 |

OTHER PUBLICATIONS

"Mobile Backbone Networks—Construction and Maintenance" Laboratory for Information and Decision Systems Massachusetts Institute of Technology, Srinivas, A., et. al.; Cambridge, MA, ACM, MobiHoc '06, May 22-25, 2006.
"Timing Over Packet, The History of RAD's Timing Over Packet Solution"; Geva, Alon; RAD Data Communications Ltd., Cat. No. 802419 Version Apr. 2008.
"Synchronization and Timing in Packet-Based Mobile Backhaul—RAD's SyncTop-Enabled Cell-Site Gateways and Demarcation Devices", RAD Data Communications Ltd., Cat. No. 802444 Version Dec. 2009.
"IEEE 1588 Version 2"; Garner, G.M.; ISPCS Ann Arbor '08, Sep. 24, 2008.
"Network Synchronization—Keeping Your Finger on the Pulse"; Agilent Technologies, Appl. Note 1367, 2001.
"IEEE 1588v2 (Precision Time Protocol) Testing", IXIA, Appl. Note, Doc. No. 9150713-01 Rev A, Dec. 2009.

(Continued)

*Primary Examiner* — Phuongchau Ba Nguyen
(74) *Attorney, Agent, or Firm* — A.C. Entis-IP Ltd.

(57) ABSTRACT

Apparatus for monitoring a packet switched network, the apparatus comprising: at least one port for receiving and transmitting packets; a local clock; and a packet inspector that uses time from the local clock to timestamp packets received at a port of the at least one port, and additionally copies timing information from received timing distribution packets, which are transmitted from a master clock to a slave clock in order to discipline the slave clock, and forwards the received packets for transmission from a port of the at least one port; wherein the apparatus uses the timestamp of a received timing distribution packet and the copied timing information to monitor timing distribution performance of the network.

22 Claims, 4 Drawing Sheets

(56) References Cited

OTHER PUBLICATIONS

"IEEE 1588 Boundary Clock and Transparent Clock Implementation Using the DP83640"; Roselot, D.; National Semiconductor Company, Appl. Note 1838, Apr. 28, 2008.
"The New Timing Standard for Packet Networks, G. 8261 (G. Pactiming)"; Ruffini, S.; Ericsson Lab Italy, Prague, Nov. 2006.
"Definitions and Terminology for Synchronization Networks", International Telecommunication Union, Recommendation G.810 (Aug. 1996).
"Introduction to IEEE 1588 & Transparent Clocks"; Gordon, C.; White Paper ,Tekron International, 2009.

* cited by examiner

TIMING OVER PACKET DEMARCATION ENTITY

TECHNICAL FIELD

Embodiments of the invention relate to timing distribution in packet switched networks.

BACKGROUND

Modern communication networks typically link many different types of mobile and/or stationary communication terminals, such as by way of example, cell phones, computers, and industrial plant equipment, to provide the terminals with an increasing menu of voice, video, and data communication services.

Each communication network operates to transport information from one to another of the terminals in the network using signals containing information relevant to the services that the network provides. In propagating from a source terminal to a destination terminal, the signals generally propagate through a plurality of network nodes that may belong. At each node the signals are received and then, after processing in the node are forwarded toward their destination.

The various services provided by a network and tasks performed at a network's nodes in configuring and/or transporting signals, are often time dependent and nodes that cooperate to configure and transport signals from a source terminal to a destination terminal generally require access to a same common reference time, reference frequency, to provide and/or support an acceptable quality of service (QoS).

For example, a cellular network generally comprises a plurality of base-stations, each of which transmits and receives wireless signals at accurately defined radio frequency (RF) carrier frequencies to and from terminals in a limited geographical area referred to as a "cell" of the network. The wireless signals carry voice and/or data to and from the terminals, which are typically the ubiquitous cell phones. The base-stations are generally connected to each other by a land line network, often referred to as a backhaul network, over which the base-stations communicate with each other to transmit messages between terminals in cells of the network.

Each base-station comprises or has access to its own "local" clock that provides a continuous isochronous train of pulses, referred to as "clock signals" or "clock pulses", characterized by an accurate and stable pulse repetition frequency, for frequency referencing the base-station operations. A clock as used herein may comprise devices that operate to maintain accuracy and stability of the pulse repetition frequency and/or operate to synchronize the pulses in frequency and time with clock pulses provided by a suitable reference clock. To transport messages and provide network services at an acceptable QoS, all the base-station clocks in the network generally have to operate with reference to substantially a same reference frequency and reference time measured by a Time of Day, (ToD) that coincides substantially with Universal Time Coordinates (UTC).

By way of example, time in cellular networks is usually distributed using a signal comprising a sequence of narrow pulses having a repetition rate accurately maintained at one pulse per second (1-PPS) referenced to UTC. The 1-PPS signal is accompanied by a time code that identifies each 1-PPS pulse by a unique designation, conventionally referred to as a time of day (ToD), which associates a date, month, year, hour, minute and second with the pulse. In a Code Division Multiple Access (CDMA) cellular system, each base-station is assigned a unique time delay offset (TDO) relative to the 1-PPS signals at which it transmits signals. The TDOs enable different base stations to be identified and cell phones to lock on to and receive signals from a base station from which it is intended to receive radio signals. To maintain integrity of the delay offsets and enable the cell phones to properly lock onto intended signals from "correct" base-stations, and successfully negotiate transfer ("handoff") from one base-station to another as they move from one to the other of the cells in the network, the network base-station clocks are required to be synchronized to a same network time to within an accuracy less than a few microseconds. The spread spectrum coding used in CDMA requires that the base-stations generate RF carrier frequencies that differ from assigned frequencies within error margins that are less than 0.05 ppm (parts per million) to maintain acceptable QoS.

For GSM cellular systems, QoS, as measured for example, by frequency of dropped calls or perceived listening quality, is considered unacceptable for fractional frequency accuracy, $\Delta f/f$, of a nominal carrier frequency, "f", greater than 1 ppm and the ETSI (European Telecommunications Standards Institute) GSM standards requires that base-stations maintain stability of frequency synthesizers and clock generators to within 0.05 ppm.

Usually, a highly accurate reference clock provides a time and a frequency standard for respectively synchronizing time and/or frequency of clocks at nodes, e.g. base-stations, in a network so that the clocks and communication equipment at the nodes operate with reference to substantially a same standard time and a same standard frequency. A reference clock referred to as a Primary Reference Clock (PRC) is expected to provide a measure of frequency accurate to at least 1 part in $10^{11}$. A reference clock referred to as Primary Reference Time Clock (PRTC) is expected to provide both a measure of frequency accurate to 1 part in $10^{11}$ and time accurate to $\pm 200$ ns (nanosecond) relative to Universal Time Coordinated (UTC). A PRC or PRTC may, for example, comprise a GPS radio receiver that receives radio signals provided by GPS satellites and transmits a time reference (e.g. 1-PPS accompanied by a ToD code) and reference clock (e.g. 10 MHz) signals that are responsive to the GPS signals, and which are regulated by a Cesium or Rubidium atomic clock. PRTC time and frequency signals based on radio signals provided by GPS satellites are often used as reference clock signals for synchronizing base-station clocks. In practice, node clocks are synchronized repeatedly and usually at regular time intervals. The process of monitoring and synchronizing a node clock to maintain it synchronized to a reference clock is conventionally referred to as "disciplining" the node clock to the reference.

In some cellular networks, each base-station node comprises a GPS receiver for receiving time reference signals for disciplining its local clock. In many cellular networks, the core network is responsible for distributing time and frequency information, hereinafter "timing information", to and from nodes in the network for disciplining their local clocks. The timing information is generated responsive to an accurate reference time and/or frequency provided by a reference clock at a node of the core network or by a reference clock to which the core network has access. A reference clock in such networks, which provides a time and/or a frequency reference for providing timing information for disciplining other clocks in the network, may also be referred to as a "master clock". A clock in the network that is disciplined responsive to the timing information may also be referred to as a "slave clock".

Various methods are used by cellular networks for distributing timing information, also referred to as "distributing time", over a core network from master clocks to slave clocks for disciplining the slave clocks. The methods are substantially different for synchronous and asynchronous communication networks. Synchronous and asynchronous communication networks transport information using procedures that are inherently very different, and conventional methods of distributing time and/or frequency to, and disciplining, slave clocks at nodes of synchronous networks are generally not applicable to asynchronous network.

In a synchronous communication networks, such as Synchronous Digital Hierarchy (SDH) or Synchronous Optical Networks, (SONET), communication between nodes is conducted over fixed paths having substantially constant latencies provided by physical links that connect the nodes. Signals are transmitted between first and second nodes in the network in well ordered sequential series of symbols having a substantially constant repetition frequency. The repetition frequency is rigorously maintained by apparatus at each node along the fixed path between the first and second nodes to within a small deviation from a predetermined standard network frequency.

All nodes in a path in the network typically have reference to a primary reference clock (PRC), from which they discipline their own local clocks. The PRC periodically sends a series of symbols compliant with the network protocols to a first node in the path, which locks onto the frequency of the symbols and adjusts its local clock to match the frequency of the received symbols. Generally, the local clocks implement a Phase Locked Loop (PLL) circuit comprising a phase error detector, a low pass filter, and a Frequency Synthesis Device (FSD), that cooperate to lock the local clock frequency to the frequency of the PRC. After the first node in the path synchronizes its clock, it transmits the series of symbols downstream along the path to a next node, which similarly adjusts the frequency of its clock and proceeds to transmit the symbol sequence downstream to a next node. The process is repeated until all the clocks in all the nodes along the path are synchronized.

In an asynchronous network, such as an Ethernet, IP, or MPLS, packet switched network (PSN), information is not transported over fixed paths between terminals and/or nodes in strictly sequential trains of symbols characterized by a constant symbol repetition rate. Information in a message transported by a PSN network is configured in packets that may travel between the same two nodes and/or terminals in the network along different paths and may experience different transit times, referred to as packet delays (PDs), in propagating between the nodes and/or terminals. For example, the availability of a plurality of alternate paths in a PSN for transporting packets between two nodes often generates a difference, referred to as a delay asymmetry, in transit time of a packet propagating from a first to a second of the nodes compared to transit time of a packet propagating from the second to the first of the nodes. Whether packets travel the same or different paths through the PSN they are generally subject to variation in packet delay (PDV) as a result for example of varying queuing delay along that path that affects their transit times, and typically introduces statistical variations in PD between two points in the network. As a result, the relatively straightforward, direct manner in which frequency is distributed in a synchronous communication network does not apply for a PSN.

To discipline a slave clock in a PSN, a master clock at a node or terminal of the PSN periodically exchanges a sequence, conventionally referred to as a "transaction", of "timing messages" with the slave clock. The timing messages comprise timing information configured in data packets, hereinafter referred to as "timing packets", compliant with the protocols of the PSN network. The timing packets comprise timing information, conventionally referred to as "timestamps", which the slave clock records, and which define times at which the timing packets egress and/or ingress the master clock and/or the slave clock. Upon completion of a transaction, the slave clock has a record comprising a set of timestamps that it uses to synchronize itself to the master clock.

Delay asymmetry and PDV inherent in a PSN network, such as a PSN backhaul network of a cellular network, make disciplining slave clocks of the network responsive to timestamps acquired in transactions, generally more complicated and error prone than disciplining clocks of a synchronous core network. Furthermore, as a number of clocks in a PSN increases, the difficulty, expense, and bandwidth overhead incurred to discipline the network clocks increases.

Whereas maintaining synchronization for PSNs is inheritably more difficult and error prone than for synchronous networks, PSNs provide substantially more efficient and flexible use of bandwidth than synchronous networks. PSNs therefore are replacing legacy SONET/SDH synchronous networks used in cellular backhaul networks and are configured and operated to support required frequency and time accuracies demanded of base-station nodes of backhaul networks. However, to meet QoS standards of anticipated increases in cellular traffic and new cellular network services, PSN networks have to anticipate providing improved monitoring of accuracy with which they distribute frequency and time to network nodes.

SUMMARY

An embodiment of the invention relates to providing apparatus, hereinafter referred to as a "Timing Over Packet Demarcation Entity" (ToPDE), for monitoring synchronization of a PSN, and quality of frequency and time distribution over the PSN, at a relatively small cost of network bandwidth. In accordance with an embodiment of the invention, the ToPDE, may be located at any "natural" or "initiated" demarcation point. A "natural demarcation" point is any point at an interface of a first communication network with a second, different, communication network or device defined by a different physical layer, operating protocol and/or administrative profile. For example, a natural demarcation point may be a point, such as a defined by a switch or router, at which a provider network ends and connects to a customer network, or where a first provider network connects to a second provider network to which the first network hands off communication signals to the second network. An "initiated" demarcation point is any point within a given network through which signals pass and remain in the given network at which a ToPDE is located and operates to monitor synchronization of the network.

In an embodiment of the invention, a ToPDE comprises at least one port for receiving and/or transmitting packets, a "local" clock, and a packet inspector. The packet inspector inspects packets propagating in the PSN that are received by the ToPDE to determine if a packet received by the ToPDE is a timing packet exchanged in a transaction between a master clock and a slave clock in the PSN. If the packet inspector determines that the packet is not a timing packet, the ToPDE optionally forwards the packet to a port of the at least one port from which it exits the ToPDE, and continues on towards its destination. If on the other hand, the packet inspector determines that the received packet is a timing packet, the packet inspector optionally copies timing information at least a portion of the received packet, and forwards the received packet from a port of the at least one port to egress the ToPDE and continue on towards its intended destination. Additionally, the ToPDE generates a "local" timestamp, responsive to time provided by its local clock, that records an ingress or egress time of the received packet at the ToPDE and/or may copy a timestamp from the copied at least portion that records an ingress and/or egress time of the received packet at the master clock and/or slave clock.

In an embodiment of the invention, the ToPDE uses local and copied timestamps to determine by how much a "local" frequency and a "local" time provided by its local clock differs from that of time and/or frequency provided by the master clock. Optionally, ToPDE uses local and copied timestamps to determine an estimate for a PD and/or PDV for the network and/or generate statistics and/or metrics sensitive to PD and/or PDV. Optionally, the ToPDE advises a network manager of a time, and/or a frequency difference between its local clock and the master clock, and/or of PD and/or PDV information that it acquires and/or generates, for use by the manager in monitoring and evaluating performance of the network in distributing time and maintaining synchronization. Optionally, the ToPDE disciplines its local clock responsive to the local and copied timestamps.

Optionally, except for inspecting packets and copying information from packets that enter the ToPDE, the ToPDE does not interact with the received packets or impede their propagation through the PSN. As a result the ToPDE is able to carry out its activities and provide information for monitoring the PSN at no or only a small bandwidth overhead to the PSN.

In an embodiment of the invention, a PSN is provisioned with a plurality of ToPDE to provide a dense, fine-granularity sampling of performance of frequency and/or time distribution, and maintenance of synchronization of the PSN.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

In the following detailed description, synchronizing clocks at nodes of a PSN in accordance with a Network Time Protocol (NTP) and a Precision Time Protocol (PTP) are discussed with reference to FIGS. 1A and 1B respectively. A PSN comprising a ToPDE is schematically shown in FIG. 2A, and monitoring time and/or frequency distribution in accordance with an embodiment of the invention is discussed with reference to the figure and a FIG. 2B, which shows a schematic block diagram of a ToPDE.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

Figure 1A:
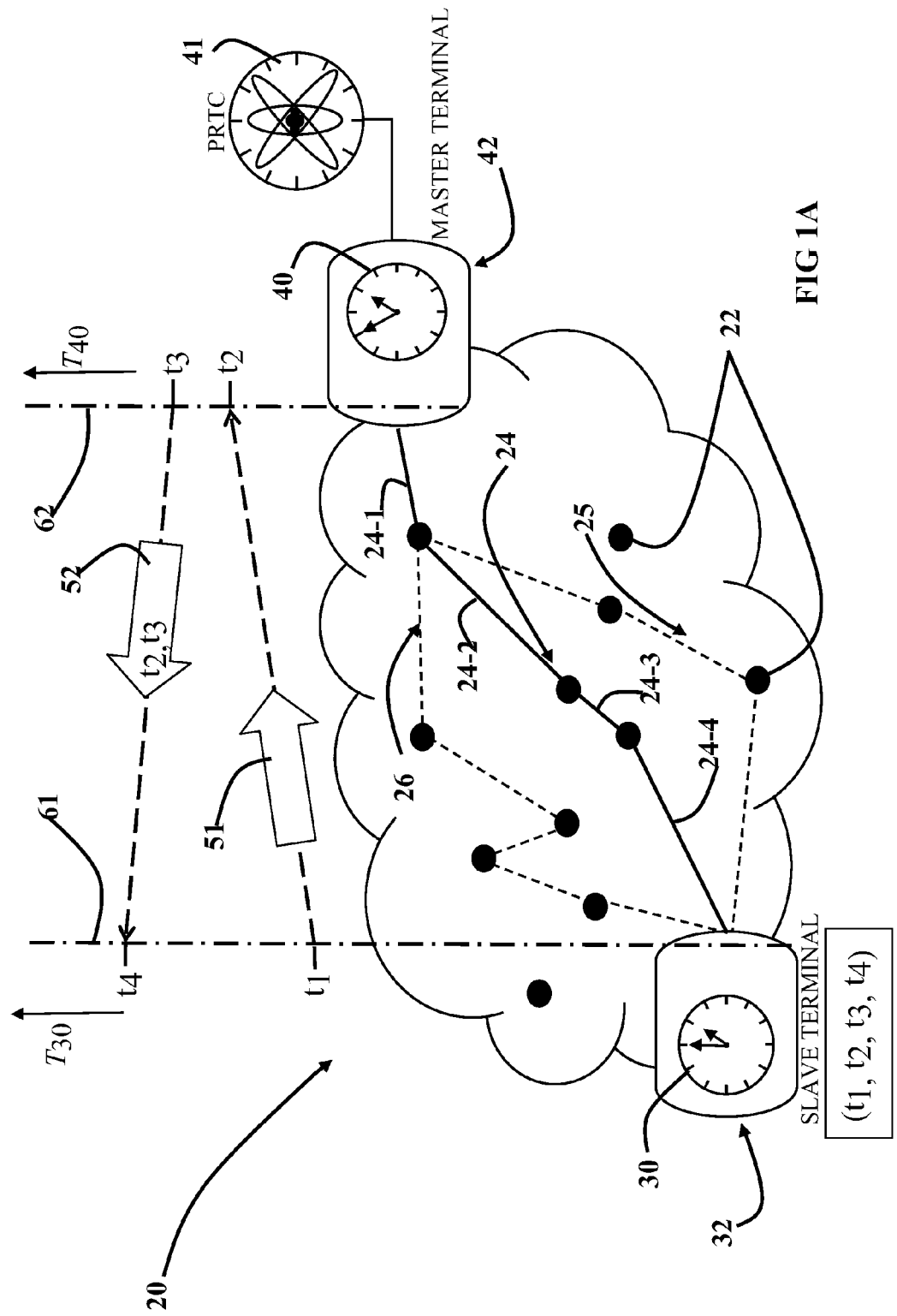
FIG. 1A schematically illustrate a PSN performing a conventional procedures referred to as Network Time Protocol (NTP), to discipline a slave clock relative to a master clock.
Figure 1B:
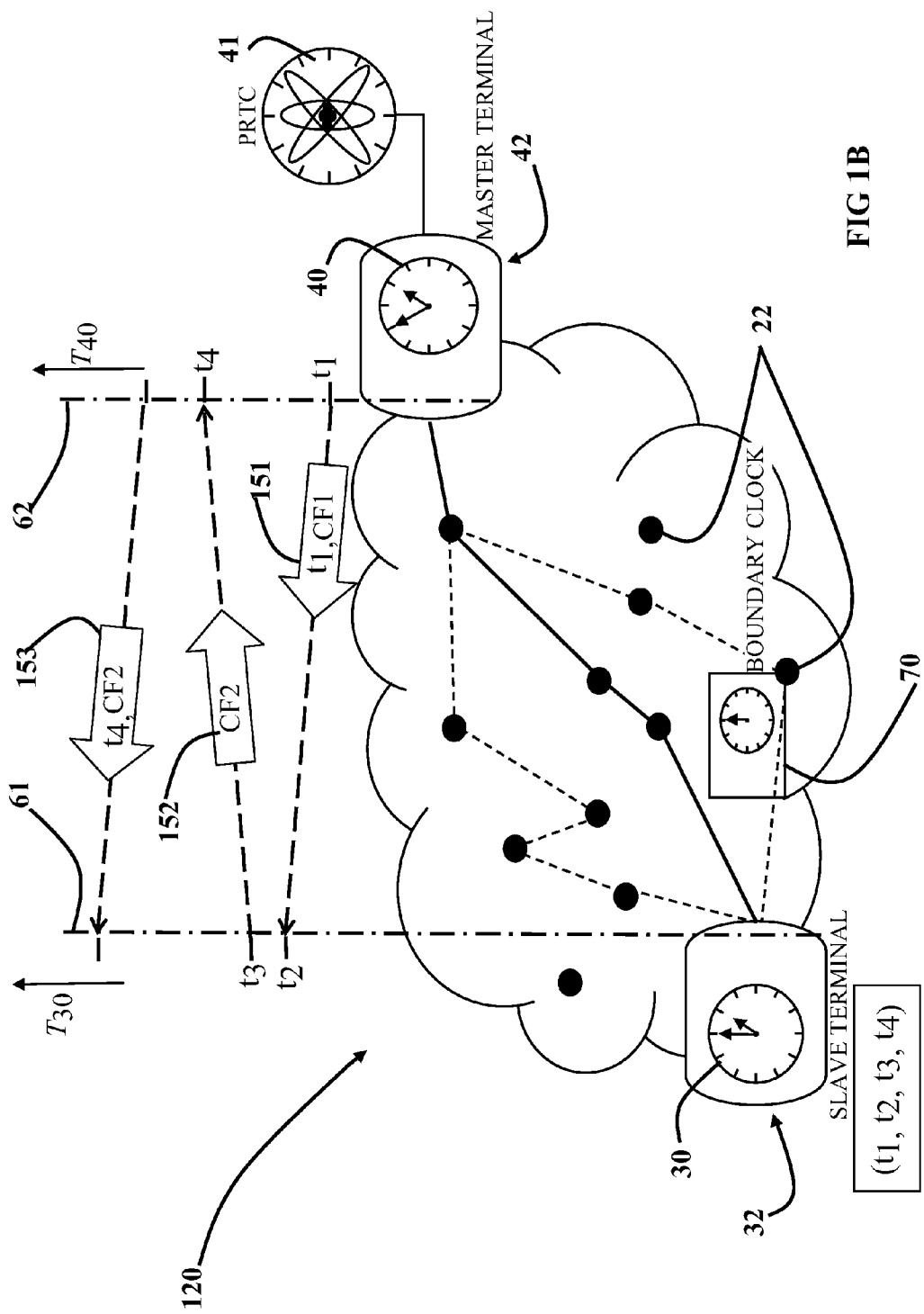
FIG. 1B schematically illustrates a PSN performing a conventional procedures referred to as Precision Time Protocol (PTP), to discipline a slave clock relative to a master clock.
Figure 2A:
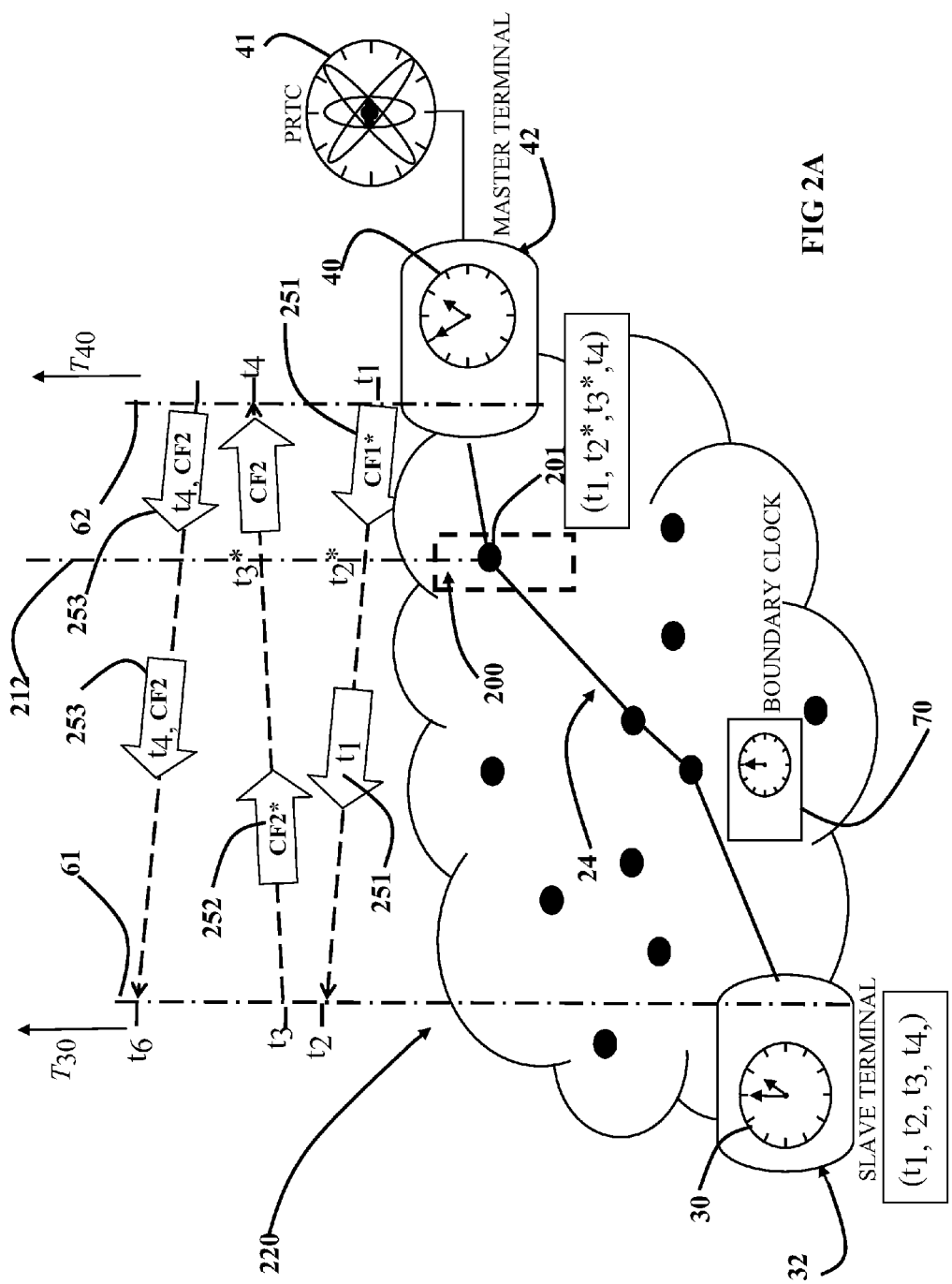
FIG. 2A schematically shows a PSN comprising a ToPDE operating in a PSN performing a conventional PTP timing procedure , in accordance with an embodiment of the invention.

FIG. 1A schematically illustrates a PSN 20 in which a slave clock 30, located optionally in a "slave" terminal 32 connected to the PSN is engaging in a timing procedure, i.e. a transaction, in accordance with a Network Time Protocol (NTP), versions of which are defined in RFC-1305 and RFC-5905, to discipline the slave clock with a master clock 40. Optionally, master clock 40 is located in a "master" terminal 42 connected to the PSN and is regulated by a Primary Reference Time Clock (PRTC) 41 comprised in or coupled to master terminal 42. Slave terminal 32 is by way of example, assumed to comprise communication equipment that performs tasks responsive to clock signals provided by slave clock 30 that require synchronization with other communication equipment connected to PSN 20.

PSN 20 comprises an ensemble of nodes, schematically represented by solid circles 22. The nodes provide a plurality of different communication paths between terminals, such as terminals 32 and 42, serviced by the PSN, and/or nodes in the PSN. For example, a communication path 24 shown in solid lines represents a communication path for which packets transmitted from master terminal 42 to slave terminal 32 have a smallest propagation time under conditions for which there is no packet delay (PD) due to communication traffic congestion. Two of a plurality of alternative communication paths between terminals 32 and 42, are schematically represented by dashed lines 25 and 26 respectively.

Slave clock 30 initiates a Network Time Protocol (NTP) transaction by transmitting a timing packet schematically represented by a block arrow 51 over path 24, to master terminal 42. Communication path 24 is optionally a "primary" path along which slave clock and master clock conduct a timing transactions. In the event that path 24 is not available for conducting a transaction, the clocks conduct transactions along designated alternate "back-up" paths, such as for example, paths 24 and 25. At a time $t_1$, as per time provided by slave clock 30, on its way to egress slave terminal 30 and propagate to along a communication path in PSN 20 towards master terminal 42, timing packet 51 crosses a well defined boundary, schematically represented by a dot-dash line 61, in the server terminal. Terminal 30 records, time $t_1$ in a timestamp ("timestamp $t_1$") that stores the transmission time of the packet from the terminal. Time as measured by slave clock 30 is schematically shown along dot-dash line 61, which is used as a time axis, and increases upwards along the axis as indicated by a time arrow $T_{30}$.

After a "slave to master" propagation delay $PD_{Sm}$, timing packet 51 is received at master terminal 42. As timing packet 51 ingresses master terminal 42, the terminal records a timestamp $t_2$, a "reception time", responsive to time $t_2$ provided by master clock 40, at which the packet crosses a well defined reference boundary, schematically indicated by a dot-dash line 62, in the master terminal. Time as measured by master clock 40 is schematically shown along dot-dash line 62, which is used as a time axis, and increases upwards along the axis as indicated by a time arrow $T_{40}$. At a subsequent time, the master terminal transmits a timing packet represented by a block arrow 52 Timing packet 52 crosses reference boundary 62 at a time $t_3$ in accordance with time provided by master clock 40 as the timing packet egresses the master terminal to propagate along a communication path in PSN 20 towards slave terminal 32. Master terminal 42 records $t_3$ in a timestamp ("timestamp $t_3$") and includes the $t_2$ and $t_3$ timestamps in packet 52.

After a master-slave propagation delay $PD_{Ms}$, timing packet 52 is received at slave terminal 32, and as it ingresses the terminal, the terminal timestamps the packet arrival with a reception timestamp $t_4$. Timestamp $t_4$ is recorded responsive to time $t_4$ provided by slave clock 30 at which packet 52 crosses reference boundary 61 on its ingress to slave terminal 32. Upon receiving timing packet 52, slave clock 30 has acquired the four timestamps $t_1$, $t_2$, $t_3$, $t_4$, shown below slave terminal 32 in FIG. 1A, and uses the times recorded in the timestamps as described below to synchronize slave clock 30 with master clock 40.

Assume that the time of master clock 40 is different from the time of slave clock 30 by an offset time $\Delta T$, which is arbitrarily defined as positive if time provided by master clock 40 is ahead of time provided by slave clock 30. Relationships between times $t_1$, $t_2$, $t_3$, $t_4$ acquired by slave clock 30 pursuant to transmission and reception of timing packets 51 and 52 may be written:

$$t_2 = t_1 + \Delta T + PD_{Sm} \quad \quad 1)$$

and $$t_4 = t_3 - \Delta T + PD_{Ms}. \quad \quad 2)$$

Equations 1) and 2) are functions of three unknown variables $\Delta T$, $PD_{Sm}$, and $PD_{Ms}$, and the two equations cannot be solved for any of the unknowns without additional information. Often, to solve for offset time $\Delta T$ it is assumed that propagation delays $PD_{Sm}$ and $PD_{Ms}$ are equal to a same propagation delay "PD". Under the assumption of equality of the propagation delays equations 1) and 2) may be solved to provide:

$$\Delta T = [(t_2 - t_1) - (t_4 - t_3)]/2; \quad \quad 3)$$

and $$PD = [(t_2 - t_1) + (t_4 - t_3)]/2. \quad \quad 4)$$

Slave clock 30 uses time offset $\Delta T$ and/or propagation delay PD in accordance with any of various methods known in the art to synchronize itself with master clock 40.

Expressions 3) and 4), as noted above assume that $PD_{Sm} = PD_{Ms} = PD$, and that PD does not change during a period of the timing transaction during which packets 51 and 52 are exchanged. However, propagation delays $PD_{Sm}$, $PD_{Ms}$ are generally not equal, and typically exhibit a difference referred to as a packet delay asymmetry noted above. Nor are the propagation delays time invariant, but typically exhibit statistical variation referred to as packet delay variation (PDV), also noted above.

For example, as noted above and shown in FIG. 1A, nodes 22 in PSN 20 provide a plurality of different communication paths between terminals 32 and 42. Packet 51 may propagate from slave terminal 32 to terminal 42 along communication path 24 and return timing packet 52 may propagate from the master terminal to the slave terminal via for example path 26. Unless propagation times along the two different paths are identical during the packet 51 and packet 52 transaction, which is generally not the case, propagation times $PD_{Sm}$ and $PD_{Ms}$ are not equal.

Even if timing packets 51 and 52 propagate over a same network path, their respective propagation times may still not be the same. Propagation time along a communication path is a function, among other things, of traffic loading of the path, which in general is a statistical variable that varies as a function of time. Traffic loading of the path at a time at which packet 51 propagates from slave to master may be different from traffic loading of the path when packet 52 is propagating in the reverse direction from master to slave. For example, assume that the timing packets propagate between terminals 32 and 42 along "shortest" communication path 24. The path comprises by way of example four segments labeled 24-1, 24-2, 24-3 and 24-4. If traffic loading of segment 24-1 on the direction from slave to master when packet 52 is transmitted over the path is substantially higher than traffic loading of the segment, on the direction from master to slave, when packet 51 is transmitted over the path, $PD_{Ms}$ of packet 52 may be different and substantially larger than $PD_{Sm}$ for packet 51.

Accuracy of synchronization of clocks in packet switched networks is generally sensitive to lack of equality between $PD_{Sm}$, and $PD_{Ms}$, and variations in the packet delays. As packet delay variation PDV increases, accuracy of synchronization in the network tends to decrease and maintenance of a desired synchronization accuracy becomes more difficult. Usually, sets of timestamps, such as $t_1$, $t_2$, $t_3$, $t_4$ are repeatedly acquired using multiple timing packet transactions and statistical trends in values for $\Delta T$ and PD and metrics sensitive to PDV are analyzed to determine and compensate for time dependence of $PD_{Sm}$, $PD_{Ms}$ and potential failure in the assumption of their equality. Examples of metrics sensitive to PDV, are time deviation (TDEV), which is a measure of a standard deviation of the second derivative of PDV, and minTDEV, which is a measure of standard deviation of the second derivative of minimum PDV.

A protocol, defined in IEEE 1588-2008 (IEEE 1588v2), referred to as Precision Time Protocol (PTP), provides for improved synchronization and monitoring of PDV in a network. The protocol operates to acquire information with respect to packet delay at more locations in a network and with greater detail than is typically available with NTP. Among other features, the PTP protocol defines improved methods for timestamping timing packets and provides for apparatus referred to as "transparent clocks" and "boundary clocks".

Transparent clocks measure transit times of timing packets through network devices that affect PDV. A transit time of a timing packet through a network device that is measured by a transparent clock is inserted into a correction field (CF) in the timing packet. The transit time, also referred to as a "residence time", is used to account for contribution to PD of the packet by time that the packet spends in the network device. A boundary clock in a PSN implementing PTP functions as both a slave to a master clock and a master clock to its own set of slave clocks in the network. Boundary clocks segment a PSN and thereby generally shorten communication paths over which timing packets are transmitted.

In accordance with PTP, a master clock, rather than a slave clock initiates a time disciplining transaction for calibrating the slave clock. FIG. 1B schematically shows a PSN 120 comprising slave and master clocks 30 and 40, and at least one boundary clock 70. The figure schematically illustrates slave clock 30 being disciplined by master clock 40 in accordance with a PTP protocol.

The master clock initiates the disciplining transaction by transmitting a timing packet 151 optionally comprising a timestamp which records a time $t_1$. Timestamp $t_1$ is generated responsive to time provided by master clock 40 at which timing packet 151 crosses a well defined reference boundary, schematically indicated by a dot-dash line 62, in master terminal 42 on its way to exit the terminal and propagate along a communication path in PSN 20 towards slave terminal 32. As timing packet 151 ingresses slave terminal 32, the terminal records a timestamp $t_2$, a "reception time", responsive to time $t_2$ provided by slave clock 30, at which the packet crosses a well defined reference boundary, schematically indicated by a dot-dash line 61, in the slave terminal. Additionally, slave clock 30 optionally records an accumulated residence time $CF_1$ registered in a correction field comprised in timing packet 151. The accumulated residence time is equal to a sum of residence times measured by transparent clocks (not shown) in PSN 120 that packet 151 endured in crossing through network devices along the packet's path from master terminal 42 to slave terminal 32.

At a subsequent slave clock 30 time $t_3$, slave terminal 32 transmits a timing packet represented by a block arrow 152 and records time $t_3$ in a timestamp. Timestamp $t_3$ represents time at which timing packet 152 crosses reference boundary 61 as it egresses the slave terminal to propagate along a communication path in PSN 20 towards master terminal 42. In propagating to the master terminal an accumulated residence time "$CF_2$" that the packet endured in devices along its path to the master terminal is stored in the packet. Upon arrival of timing packet 152 at master terminal 42, the master terminal produces a timestamp that records a time $t_4$, which is a time that packet 152 crosses reference boundary 62 as it ingresses the master terminal.

Master terminal 42 then transmits a timing packet, schematically represented by a block arrow 153, comprising timestamp $t_4$ and accumulated residence time $CF_2$ to slave clock 30. Upon arrival at slave clock 30, the slave clock has timestamps recording times $t_1$, $t_2$, $t_3$, $t_4$, (shown below slave terminal 32 in FIG. 1B) as well as accumulated residence times $CF_1$ and $CF_2$. The slave clock uses timestamps $t_1$, $t_2$, $t_3$, $t_4$, and $CF_1$ and $CF_2$ to determine $\Delta T$ and PD in accordance with the relationships, $$\Delta T=[(t_2-t_1-CF_1)-(t_4-t_3-CF_1)]/2; \quad (5)$$

and $$PD=[(t_2-t_1-CF_1)+(t_4-t_3-CF_2)]/2. \quad (6)$$

It is noted that in accordance with PTP, boundary clock 70 in a role of a slave clock is disciplined by master clock 40 using a same procedure as used to discipline slave clock 30. Boundary clock 70, in turn disciplines slave clocks (not shown in FIG. 1B) for which the boundary clock operates as a master clock in accordance with the PTP procedures.

FIG. 2A schematically shows a PSN 220 similar to PSN 20 and PSN 120 comprising a master clock 40, a slave clock 30, and in addition, in accordance with an embodiment of the invention, a ToPDE 200.

In FIG. 2A slave clock 30 is schematically shown being disciplined to master clock 40 using a PTP protocol and ToPDE 200 is shown "eavesdropping" on a timing transaction between the slave and master to generate timing information, in accordance with an embodiment of the invention. ToPDE 200 is optionally located at a node 201 common to communication path 24, which is used as a primary transaction path between master terminal 42 and slave terminal 32, and communication paths 25 and 26 (shown on FIGS. 1A and 1B), which are used as back-up transaction paths by the slave and master clocks.

Figure 2B:
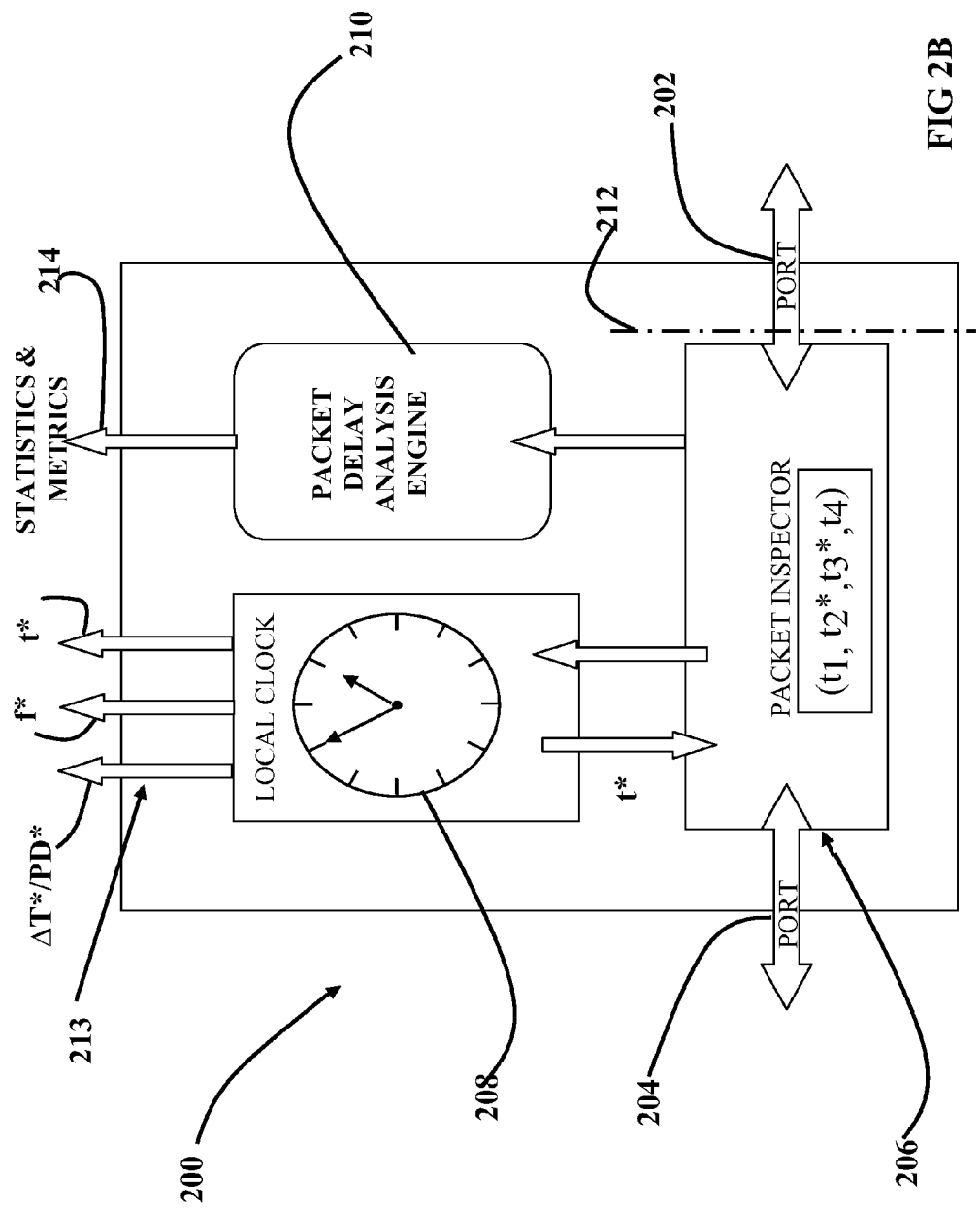
FIG. 2B shows a schematic block diagram of a ToPDE, in accordance with an embodiment of the invention.

FIG. 2B shows a schematic block diagram of ToPDE 200 in accordance with an embodiment of the invention. ToPDE 200 optionally comprises first and second ports 202 and 204 respectively for receiving and transmitting packets, a packet inspector 206, a local clock 208, and a packet delay analysis engine 210. Functions of the components and how they cooperate to generate timing information, in accordance with an embodiment of the invention, are described below.

Referring to FIG. 2A, master clock 40 at master terminal 42 initiates the timing transaction by transmitting a timing packet 251 to slave clock 30 in slave terminal 32. The master terminal generates a timestamp, as per time provided by master clock 40, for a time $t_1$ at which timing packet 251 crosses a well defined reference boundary, in master terminal 42 on its way to exit the terminal and propagate along a communication path in PSN 20 towards slave terminal 32. In FIGS. 2A and 2B, the reference boundary is schematically indicated by a dot-dash line 62. As packet 251 propagates to slave terminal 32, a correction field in the packet is updated with residence times for devices in PSN 220 through which it passes.

On its way to slave terminal 32, packet 251 is received at port 202 of ToPDE 200, and crosses a reference boundary 212 in the ToPDE at a time $t_2^*$ measured by ToPDE clock 208. ToPDE 200 records time $t_2^*$ in a timestamp. An accumulated residence time for the packet resulting from the residence times the packet experiences in the PSN devices on its journey from master terminal 42 to ToPDE 200 is represented by $CF_1^*$. From port 202 timing packet 251 proceeds to packet inspector 206. Packet inspector 206 inspects timing packet 251 to determine if it is a timing packet transmitted in a disciplining transaction and optionally if the transaction belongs to a predetermined group of PTP transactions that the ToPDE is intended to monitor. If it is, the packet inspector copies timing information from the timing packet, the information comprising $t_1$ and/or $CF_1^*$, and forwards the timing packet to port 204, from which port the timing packet continues on to slave terminal 32. If the packet is not a timing packet the packet inspector discards $t_2^*$ and forwards the packet without copying timing information from of the packet. Optionally, packet inspector 206 may implement a PTP transparent clock between ports 202 and 204 so that any propagation delay ToPDE may introduce between these ports may later be compensated for at slave clock 30. As timing packet 251 ingresses slave terminal 32, the terminal records a timestamp for a time $t_2$ responsive to time provided by slave clock 30, at which the packet crosses a well defined reference boundary, schematically indicated by a dot-dash line 61, in the slave terminal.

At a subsequent slave clock time, $t_3$ the slave terminal transmits a timing packet represented by a block arrow 252 to master terminal 42. The slave terminal generates a timestamp for a transmission time, $t_3$, of packet 252 as a time provided by slave clock 30, at which the packet crosses a reference boundary 61 as the packet egresses the terminal. A correction field in the packet is optionally updated with residence times the packet experiences in traversing network devices as it propagates to master terminal 42.

On its way to the master terminal, timing packet 252 is received at port 204 (FIG. 2B) of ToPDE 200 and enters packet inspector 206. The packet inspector checks if the packet is a timing packet and optionally whether it belongs to the predetermined group of PTP transactions that the ToPDE is intended to monitor. If so, it copies timing information comprised in timing packet 252, including an accumulated residence time, represented by $CF_2^*$ that the packet experienced in traveling from slave terminal 32 to ToPDE 200. If not, packet inspector 206, directs the packet to port 202 to exit ToPDE 200 and proceed on towards its destination.

Following copying of timing information, packet inspector 206 forwards the packet to port 202 from which it continues on to master terminal 42. ToPDE 200 generates a timestamp for a time $t_3^*$, as per time provided by clock 208, at which the packet crosses reference boundary 212 as it egresses the ToPDE. Optionally, packet inspector 206 may implement a PTP transparent clock between ports 204 and 202 so that a propagation delay, i.e. a residence time spent in ToPDE 200, that ToPDE may introduce between these ports can later be compensated for at slave clock 30. After leaving ToPDE 200, the conection field in packet 252 is updated with residence times the packet experiences in traveling to master terminal 42. The accumulated residence times in the conection field of packet 252 after leaving ToPDE 200, which includes accumulated residence times $CF_2^*$, is represented by $CF_2$.

Upon arrival of timing packet 252 at master terminal 42, the master terminal records a timestamp for a time $t_4$ at which the timing packet crosses reference boundary 62. The master terminal subsequently transmits a timing packet 253 to slave terminal 32 to inform the slave terminal of the values for $t_4$ and $CF_2$. On its way to slave clock 30, timing packet 253 is received at port 202 of ToPDE 200. From port 202, timing packet 253 enters packet inspector 206 where, if identified to be a timing packet in the predetermined group of monitored PTP transactions, timing information, including at least timestamp $t_4$ and $CF_2$, is copied from the packet and the packet itself is forwarded to exit the ToPDE and proceed towards slave terminal 32.

Once the transaction is completed (after exchange of timing packets 251, 252, and 253), slave clock 30 has a recorded set of timestamps $t_1, t_2, t_3, t_4$, shown below terminal 32 in FIG. 2A, as well as $CF_1$ and $CF_2$ for use in determining $\Delta T$ and PD according to equations 5) and 6).

Because of the negligible invasive interference of ToPDE 200 with propagation of timing packets between master clock 40 and slave clock 30, the slave clock acquires $t_1, t_2, t_3, t_4$ substantially without interference by ToPDE 200. In addition however, at substantially no cost in excess bandwidth, ToPDE 200 has acquired a set of times comprising $t_1, t_2^*, t_3^*, t_4$, shown to the right of ToPDE 200 in FIG. 2A, as well as correction field contents $CF_1^*, CF_2^*$, and $CF_2$. These are used to determine an offset time $\Delta T^*$ between ToPDE clock 208 and master clock 40 in accordance with an expression, $$\Delta T^* = [(t_2^* - t_1 - CF_1^*) - (t_4 - t_3^* - CF_2 + CF_2^*)]/2; \quad 7)$$

and
a propagation delay, $PD^*$, between ToPDE 200 and master terminal 40 in accordance with an expression, $$PD^* = [(t_2^* - t_1 - CF_1^*) + (t_4 - t_3^* - CF_2 + CF_2^*)]/2 \quad 8)$$

In an embodiment of the invention, ToPDE 200 uses $\Delta T^*$ and $PD^*$ to discipline its clock 208 and synchronize its frequency $f^*$ and time $t^*$, with master clock 40. Any of various methods known in the art may be used by ToPDE 200 to discipline its clock responsive $\Delta T^*$ and $PD^*$. ToPDE 200 may for example use any of various statistical moments of values of $\Delta T^*$ and $PD^*$ acquired during different transactions between master and slave clocks 40 and 30 to determine disciplined correction values for $f^*$ and $t^*$.

ToPDE 200 optionally comprises apparatus for making available and/or transmitting values for at least one of, $f^*, t^*, \Delta T^*, PD^*$ to measurement equipment or a network manager (not shown) of PSN 220 for use in determining features of packet transport along communication paths in PSN 220 over which packets are transported to and from ToPDE 200. Block arrows 213, schematically represent apparatus configured to transmit and/or make available data generated by ToPDE 200 to the PSN manager and are labeled with examples of the data. Optionally, the apparatus comprises a port configured to present the values. Optionally, the apparatus comprise circuitry and a transmitter for coding and packaging the values in packets and transmitting the packets to the PSN manager via the packet network.

In an embodiment of the invention (not shown), ToPDE 200 may use interfaces 213 to receive accurate time and frequency information supplied by an external frequency/time reference of PSN 220. Such frequency and time information may be used to discipline ToPDE clock 208, so that it provides accurate time information to packet inspector 206.

In an embodiment of the invention, packet inspector 206 transmits local timestamps that it generates, timestamps, and information in packet correction fields that it copies from timing packets that traverse ToPDE 200 to packet delay analysis engine 210. The packet delay analysis engine processes the timing information that it receives from packet inspector 206 to generate statistics and/or metrics germane to PD and PDV analysis and correction. The engine may forward the statistics and/or metrics to a network manager (not shown) of PSN 220 for use in monitoring the network and providing a desired QoS. Transmission of data provided by packet delay analysis engine 210 is schematically represented by a block arrow 214. Optionally, packet delay analysis engine 210 has access to a dedicated port for making available or transmitting statistics and/or metrics it generates. Alternatively or additionally the packet delay analysis engine may use any available port comprised in ToPDE 200 for transmitting or making available the data it generates.

It is noted that in the above description, ToPDE 200 is described as acquiring and generating timestamps and timing information from timing packets transmitted between a master and slave clock in accordance with a PTP protocol. Embodiments of the invention are of course not limited to a PTP protocol. For example, ToPDE 200 may generate timestamps and copy data from timing packets transmitted according to an NTP protocol similarly to the manner in which it generated timestamps and copied data from PTP timing packets.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. Apparatus for monitoring a packet switched network, the apparatus comprising:
   at least one port for receiving and transmitting packets;
   a local clock;
   a packet inspector that uses time from the local clock to timestamp packets received at a port of the at least one port, copies timing information from the received packets if the packets are timing distribution packets, which are transmitted between a master clock and a slave clock in order to synchronize the slave clock to the master clock, and forwards the received packets for transmission from a port of the at least one port towards a packet destination that is not a packet source from where the packets originate; and an analysis engine that receives from the packet inspector the copied timing information and timestamps of a plurality of the forwarded packets, and processes the received timing information and timestamps to generate statistics and/or metrics sensitive to packet delay (PD) and/or packet delay variation (PDV)

wherein the apparatus uses the timestamps of the received timing distribution packets and the copied timing information to monitor timing distribution performance of the network.

2. Apparatus according to claim 1 wherein using the timestamp and the copied timing information comprises determining an offset time between time provided by the local clock and a reference time provided by the master clock.

3. Apparatus according to claim 1 wherein the copied timing information comprises at least one timestamp recording a transmission or reception time of a received packet at the slave or master clock.

4. Apparatus according to claim 1 wherein the local clock uses the timestamp of the received packet and the copied timing information to determine a difference between a frequency of the local clock and a frequency of the master clock.

5. Apparatus according to claim 1 wherein the timing distribution packets conform to the IETF Network Timing Protocol (NTP).

6. Apparatus according to claim 1 wherein the timing distribution packets conform to the IEEE Precision Timing Protocol (PTP).

7. Apparatus according to claim 6 wherein copied timing information comprises correction field timing information.

8. Apparatus according to claim 1 and including a transparent clock that operates to determine a transit time of a packet through the apparatus.

9. Apparatus according to claim 1 and including a port for receiving a time and/or frequency from a reference clock.

10. Apparatus according to claim 9 wherein the local clock uses the reference clock time and/or frequency to discipline itself.

11. Apparatus according to claim 1 wherein the apparatus comprises an analysis engine that generates statistics and/or metrics responsive to timing distribution performance.

12. Apparatus according to claim 1 and comprising apparatus for providing a value for at least one of the statistics and/or metrics to a network management system of a packet switched network.

13. A packet switched network comprising at least one apparatus according to claim 12.

14. A packet switched network according to claim 13 wherein the at least one apparatus is located at each of at least one demarcation point of the network.

15. A packet switched network according to claim 13 and comprising a network management system that receives a value for at least one parameter from the apparatus useable to discipline a clock in the network.

16. A packet switched network according to claim 15 wherein the network management system uses the value to monitor the network.

17. A packet switched network according to claim 15 wherein the network manager uses the value to monitor performance of a segment of the path between master clock and slave clock.

18. A packet switched network according to claim 15 wherein the network management system uses the value to monitor packet delay in a portion of the network.

19. A packet switched network according to claim 15 wherein the network management system changes a feature of the network responsive to the value.

20. A packet switched network according to claim 15 wherein the network management system changes the routing of timing distribution packets responsive to the value.

21. A packet switched network according to claim 15 wherein the network management system generates an alarm responsive to the value.

22. A packet switched network comprising at least one apparatus according to claim 1.

* * * * *